United States Patent
Cho

(10) Patent No.: US 10,106,165 B2
(45) Date of Patent: Oct. 23, 2018

(54) SHIFT CONTROL METHOD FOR VEHICLE WITH DCT

(71) Applicant: Hyundai Motor Company, Seoul (KR)

(72) Inventor: Sung Hyun Cho, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 150 days.

(21) Appl. No.: 15/363,921

(22) Filed: Nov. 29, 2016

(65) Prior Publication Data

US 2017/0369068 A1 Dec. 28, 2017

(30) Foreign Application Priority Data

Jun. 27, 2016 (KR) .......................... 10-2016-0080061

(51) Int. Cl.

| | | |
|---|---|---|
| *B60W 10/02* | (2006.01) | |
| *B60W 30/19* | (2012.01) | |
| *B60W 10/06* | (2006.01) | |
| *B60W 10/113* | (2012.01) | |

(52) U.S. Cl.
CPC ............ *B60W 30/19* (2013.01); *B60W 10/02* (2013.01); *B60W 10/06* (2013.01); *B60W 10/113* (2013.01); *B60W 2540/10* (2013.01); *B60W 2710/0644* (2013.01); *B60W 2710/0661* (2013.01); *B60W 2710/0666* (2013.01); *B60W 2710/1005* (2013.01)

(58) Field of Classification Search
CPC .............................. B60W 30/19; B60W 10/02
See application file for complete search history.

(56) References Cited

U.S. PATENT DOCUMENTS

| | | | | |
|---|---|---|---|---|
| 2007/0270281 | A1* | 11/2007 | Inoue ................... | B60W 10/02 477/180 |
| 2015/0149016 | A1* | 5/2015 | Saitoh ................... | B60K 6/485 701/22 |
| 2017/0356546 | A1* | 12/2017 | Cho ...................... | B60W 20/00 |
| 2017/0369068 | A1* | 12/2017 | Cho ...................... | B60W 10/02 |

(Continued)

FOREIGN PATENT DOCUMENTS

| | | |
|---|---|---|
| JP | 2011-002007 A | 1/2011 |
| JP | 2011-218890 A | 11/2011 |
| JP | 2015-507722 A | 3/2015 |

(Continued)

*Primary Examiner* — Derek D Knight
(74) *Attorney, Agent, or Firm* — Morgan, Lewis & Bockius LLP

(57) ABSTRACT

A shift control method for the vehicle with a DCT may include a start determining step of determining, by a TCU, whether the DCT may have entered a power-on down shift inertia phase, a clutch control step of controlling a release-side clutch by determining, by the TCU, a release-side clutch control torque, when the DCT enters the power-on down shift inertia phase, a limit determining step of determining whether the release-side clutch control torque is reduced below a predetermined minimum control torque, while the TCU performs the clutch control step, and an engine-assistance requesting step of requesting an ECU to set an engine-torque rise request amount in proportion to a release-side clutch control torque reduction amount that is additionally required by the TCU, when it is determined in the limit determining step that the release-side clutch control torque is reduced below the minimum control torque.

6 Claims, 3 Drawing Sheets

(56) References Cited

U.S. PATENT DOCUMENTS

2018/0126996 A1* 5/2018 Park ................ B60W 10/02

FOREIGN PATENT DOCUMENTS

| | | |
|---|---|---|
| JP | 2015-143568 A | 8/2015 |
| JP | 2016-002950 A | 1/2016 |
| KR | 10-2006-0067698 | 6/2006 |
| KR | 10-2015-0125756 A | 11/2015 |

* cited by examiner

SHIFT CONTROL METHOD FOR VEHICLE WITH DCT

CROSS REFERENCE TO RELATED APPLICATION

The present application claims priority to Korean Patent Application No. 10-2016-0080061 filed on Jun. 27, 2016, the entire contents of which is incorporated herein for all purposes by this reference.

BACKGROUND OF THE INVENTION

Field of the Invention

The present invention relates to a shift control method for a vehicle equipped with a DCT (Dual Clutch Transmission), and more particularly to a method for controlling a power-on down shift.

Description of Related Art

A state of driving a driving wheel using power of an engine in proportion to the displacement of an accelerator pedal when a driver actuates the pedal is referred to as a power-on state. A situation where a down shift to a lower gear shift stage occurs in the power-on state is referred to as a power-on down shift.

In the case of the above-mentioned power-on down shift, as a release-side clutch is released, the speed of the engine is increased by engine torque to synchronize with a coupling-side input shaft speed, so that a gear shift operation is performed.

In an ultra-low APS (Accelerator Position Sensor) signal outputting situation where a driver presses on the accelerator pedal but a pressing amount is very small, the torque of the engine may be insufficient even if a release-side clutch is sufficiently released, so that the speed of the engine may not be increased to a targeted change rate. This delays a time when the engine speed synchronizes with the coupling-side input shaft speed, thus leading to a delayed gear shift and consequently inhibiting the gear shift operation from being smoothly performed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shift control method for a vehicle with a DCT, which allows a gear shift operation to be stably and rapidly performed even in an ultra-low APS situation where the amount of an accelerator pedal pressed by a driver is very small, thus guaranteeing a rapid response to gear shift and stability, and consequently enhancing the marketability of the vehicle.

According to one aspect, there is provided a shift control method for the vehicle with a Dual Clutch Transmission (DCT) including: a start determining operation of determining, by a TCU (Transmission Control Unit), whether the DCT has entered a power-on down shift inertia phase; a clutch control operation of controlling, by the TCU, a release-side clutch by determining a release-side clutch control torque, when the DCT enters the power-on down shift inertia phase; a limit determining operation of determining whether the release-side clutch control torque is reduced below a predetermined minimum control torque, while the TCU performs the clutch control operation; and the engine-assistance requesting operation of requesting an engine control unit (ECU) to set an engine-torque rise request amount in proportion to a release-side clutch control torque reduction amount that is additionally required by the TCU, when it is determined in the limit determining operation that the release-side clutch control torque is reduced below the minimum control torque.

The engine-assistance requesting operation may be repeatedly performed until an engine speed synchronizes with a synchronous speed.

The release-side clutch control torque of the clutch control operation may be determined by adding a release torque, determined to form a change rate in target engine speed during the inertia phase, to a previous release-side clutch control torque, and then adding an obtained value to a feedback amount determined by a target change rate in engine speed and a current change rate in engine speed.

The minimum control torque of the limit determining operation may be set to zero.

The minimum control torque of the limit determining operation may be set to a clutch torque that is set at a touch point by the release-side clutch.

The engine-torque rise request amount of the engine-assistance requesting operation may be determined as a feedback amount that is accumulated after a time when the release-side clutch control torque starts to become less than the minimum control torque, after a feedback amount accumulated to a time is subtracted from an accumulative feedback amount obtained by accumulating the feedback amount used to determine the release-side clutch control torque.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
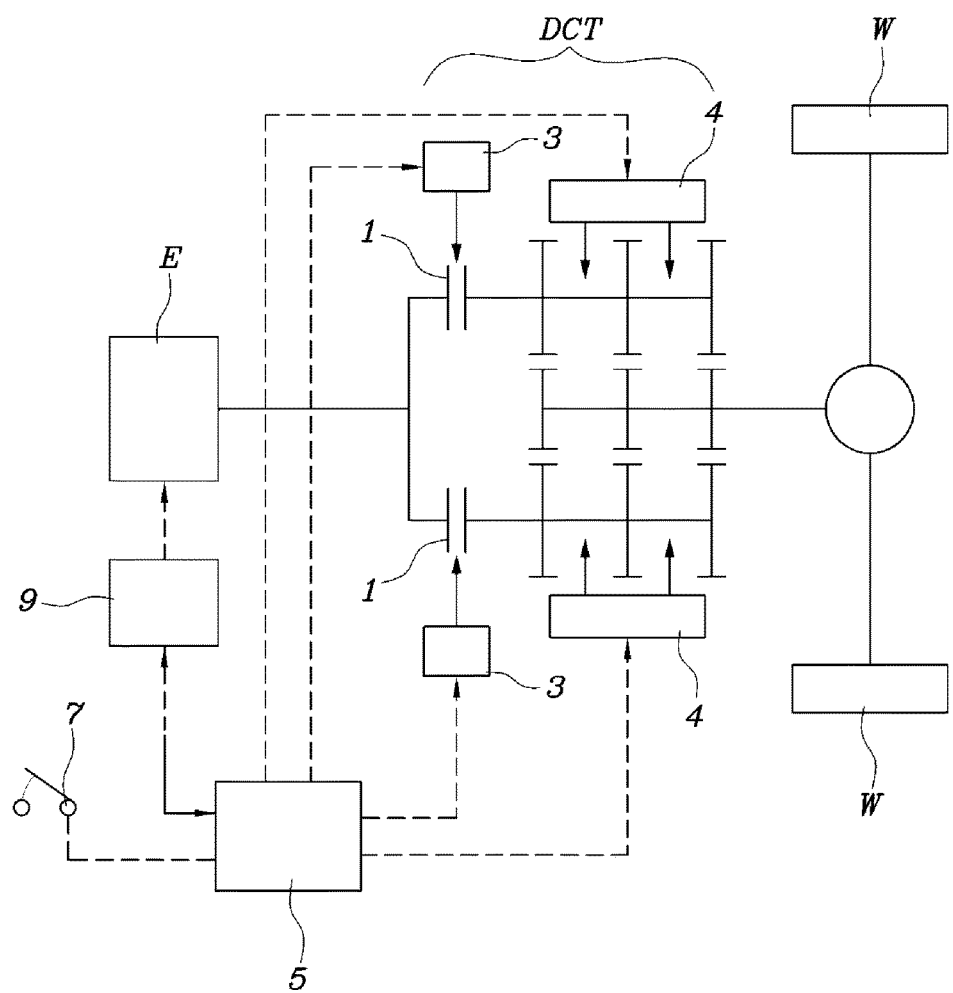
FIG. 1 is a diagram illustrating a power train of the vehicle equipped with a DCT according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the intended application and use environment.

In the figures, reference numbers refer to a same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, embodiments of the present invention will be described in detail with reference to the accompanying drawings.

FIG. 1 is a diagram illustrating a power train of the vehicle equipped with a DCT according to an exemplary embodiment of the present invention. The DCT, which receives power from the engine E through two clutches 1, transmits the power to driving wheels W.

During a gear shift operation, one of the two clutches 1 is released, whereas the other is coupled. Thus, the clutches relatively serve as a release-side clutch and a coupling-side clutch depending on gear shift conditions. A transmission input shaft is connected to each of the clutches 1. An input shaft connected to the release-side clutch participating in forming a previous gear shift stage is referred to as a release-side input shaft, while an input shaft connected to the coupling-side clutch participating in forming a target gear shift stage is referred to as a coupling-side input shaft.

The two clutches 1 are driven by clutch actuators 3 that control clutch torques transmitted from the corresponding clutches by substantially controlling strokes of the clutches. The clutch actuators 3 are controlled by a TCU (Transmission Control Unit) 5.

The TCU 5 receives an accelerator-pedal displacement from an APS (Accelerator Position Sensor) 7, determines whether it is necessary to perform the gear shift operation, controls the clutch actuators 3, and controls gear shift actuators 4 that drive a synchronizer of the DCT to perform the gear shift operation, and communicates with an ECU (Engine Control Unit) 9 that is a controller controlling the engine E to receive information, for example, an engine torque, an engine speed and the like, and requests to regulate the engine torque.

Although this embodiment illustrates a configuration where the TCU and the ECU are separately provided, they may be incorporated into one controller and may be configured to perform other functions as well. Further, the TCU and the ECU may exchange information by a direct communication method as well as a communication method such as a Controller Area Network (CAN).

Figure 2:
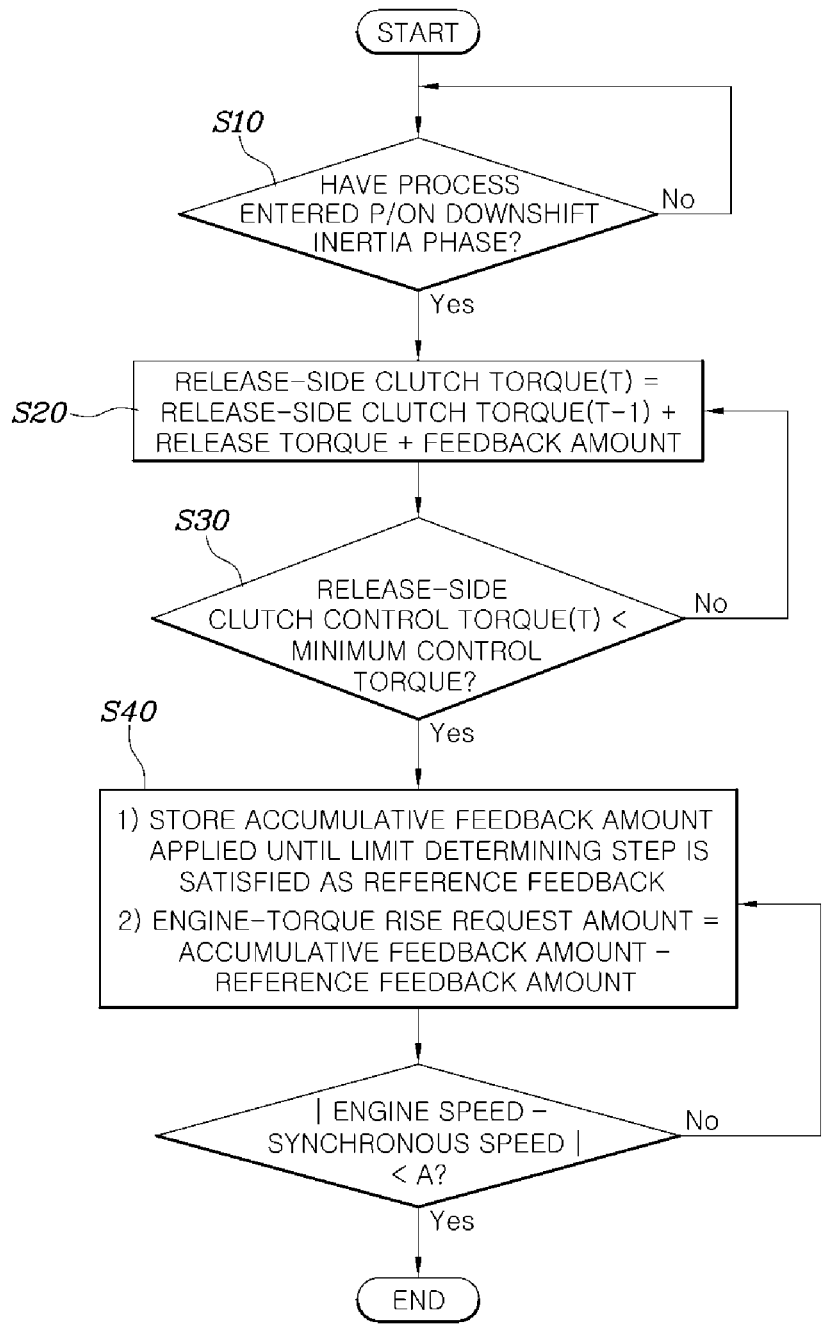
FIG. 2 is a flowchart illustrating an embodiment of a shift control method for the vehicle with a DCT according to an exemplary embodiment of the present invention vehicle.

Referring to FIG. 2, a shift control method for the vehicle with the DCT according to an exemplary embodiment of the present invention includes a start determining step S10 of determining, by the TCU, whether the DCT has entered a power-on down shift inertia phase, a clutch control step S20 of controlling, by the TCU, a release-side clutch by determining a release-side clutch control torque, when the DCT enters the power-on down shift inertia phase, a limit determining step S30 of determining whether the release-side clutch control torque is reduced below a predetermined minimum control torque, while the TCU performs the clutch control step S20, and an engine-assistance requesting step S40 of requesting an ECU to set an engine-torque rise request amount in proportion to a release-side clutch control torque reduction amount that is additionally required by the TCU, when it is determined in the limit determining step S30 that the release-side clutch control torque is reduced below the minimum control torque.

That is, in the present embodiment, as the process enters the power-on down shift and releases the release-side clutch, when the engine speed should be increased by the engine torque to synchronize with the coupling-side input shaft speed, the engine speed may not reach the synchronous speed yet even though the release-side clutch control torque has been reduced to the minimum control torque. In this state, unless a current change rate in engine speed reaches a target change rate in engine speed (target dNe/dt), this may be considered as an ultra-low APS situation where a driver does not press on an accelerator pedal to a level to increase the engine speed. This may not achieve the target change rate in engine speed any more, merely by controlling the release-side clutch, thus causing a delayed gear shift. To prevent it, the engine-assistance requesting step S40 is performed to request the ECU to set the engine-torque rise request amount so that the engine speed is increased according to the target change rate in engine speed.

The engine-assistance requesting step S40 is repeatedly performed until the engine speed synchronizes with the synchronous speed, namely, the coupling-side input shaft speed.

The TCU determines whether the power-on down shift has started depending on the driving condition of the vehicle, and determines that the process enters the inertia phase in which the engine speed synchronizing with the current gear shift stage is changed to and synchronized with the speed of the target gear shift stage. This employs the related art that is known to those skilled in the art.

Referring to the flowchart of FIG. 2, to determine whether the engine speed reaches the synchronous speed, when a difference between the engine speed and the synchronous speed is less than a predetermined value A that is a standard for determining synchronization, it is determined that synchronization is achieved. Of course, the value A may be properly selected as long as it is possible to determine the synchronization. Thus, the value A may be set to a value within several tens RPM.

The release-side clutch control torque of the clutch control step S20 is determined by adding a release torque, determined to form a change rate in target engine speed during the inertia phase, to a previous release-side clutch control torque, and then adding an obtained value with a feedback amount determined by a target change rate in engine speed and a current change rate in engine speed.

An initial value of the previous release-side clutch control torque may become a release-side clutch control torque before the process enters the inertia phase.

The release torque is obtained by determining, as a clutch torque value, a degree to which the clutch should be released to increase the engine speed according to the target change rate in engine speed, after the TCU determines the target change rate in engine speed required to perform the power-on down shift. The feedback amount is obtained by determining, as a clutch torque value, an amount required to eliminate a difference between the target change rate in engine speed and the current change rate in engine speed. In this regard, the TCU accumulates the feedback amount generated after the inertia phase has started, thus determining an accumulative feedback amount.

The minimum control torque of the limit determining step S30 is set to a clutch torque that is formed at a touch point by the release-side clutch. The minimum control torque may be substantially set to zero.

That is, when the release-side clutch is released to the touch point so that the torque transmitted through the clutch is substantially 0 or less, even when the clutch is released to decrease the clutch torque to a negative value, this may not substantially affect the change rate in engine speed. Thus, such a situation causes the engine-assistance requesting step S40 to be performed.

The engine-torque rise request amount of the engine-assistance requesting step S40 is determined as a feedback amount that is accumulated after a time when the release-side clutch control torque starts to become less than the minimum control torque, after a reference feedback amount, namely, a feedback amount accumulated to the time is subtracted from an accumulative feedback amount obtained by accumulating the feedback amount used to determine the release-side clutch control torque.

The reason why the reference feedback amount is subtracted is because it is already reflected in controlling the release-side clutch.

Therefore, the ECU receiving the engine-torque rise request amount of the TCU controls the engine by adding the engine-torque rise request amount to the engine torque determined by the displacement of the accelerator pedal so that the change rate in engine speed corresponds to the target change rate in engine speed, thus preventing the gear shift operation from being delayed and allowing the power-on down shift to be smoothly performed.

Figure 3:
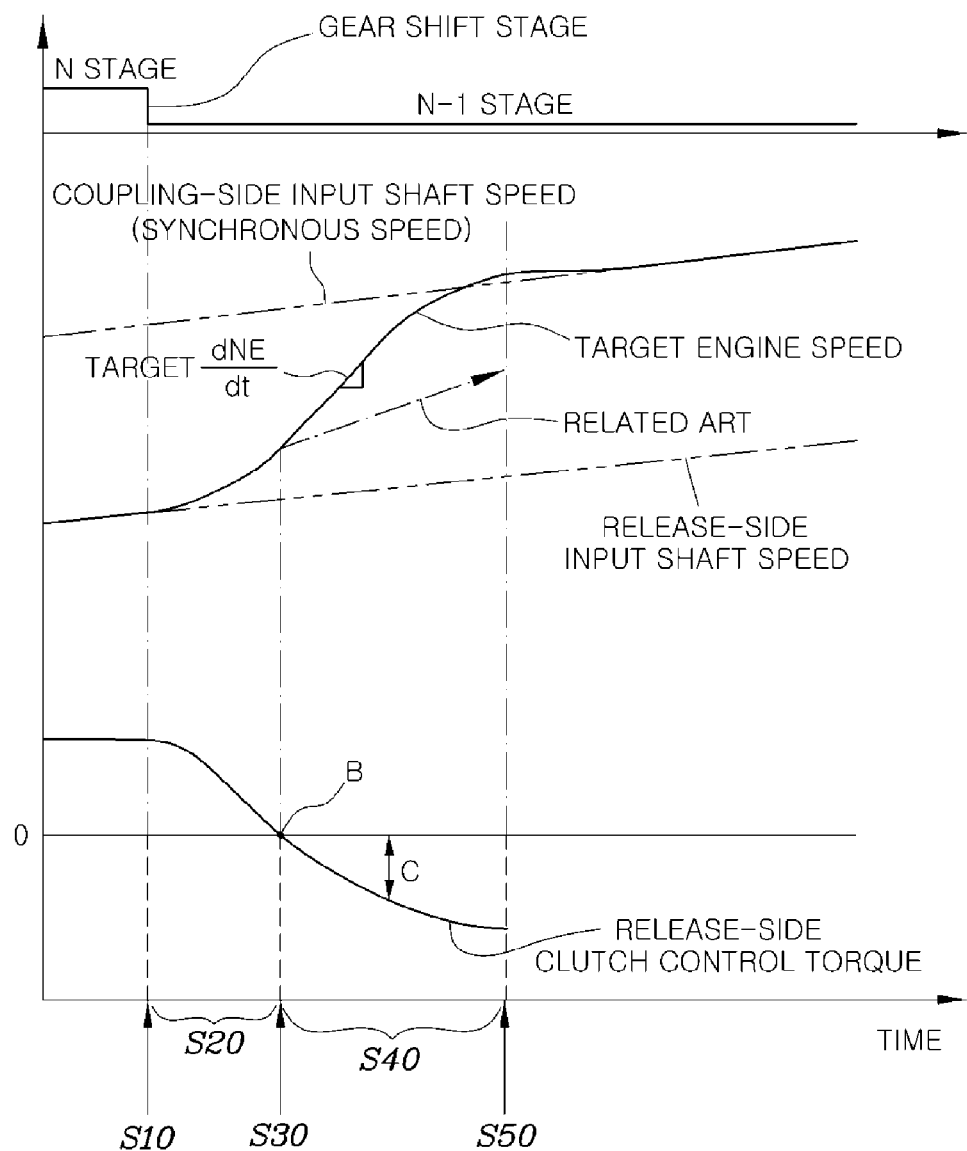
FIG. 3 is a graph illustrating the present invention.

Referring to FIG. 3, up to point B at which the release-side clutch control torque passes by zero (0), the engine speed follows the target engine speed, even in the related art, by the feedback control of the release-side clutch torque. However, after the point B, according to the related art, the engine speed is relatively slowly increased towards the synchronous speed, at a change rate in speed lower than the target change rate in engine speed. In contrast, according to an exemplary embodiment of the present invention, even after point B, the engine-assistance requesting step S40 is repeatedly performed, so that the engine speed is changed according to the trajectory of the target engine speed while forming the target change rate in engine speed. Consequently, the gear shift operation is performed at a proper time targeted by the TCU.

Reference character C of FIG. 3 denotes an amount to which the release-side clutch should be released to increase the engine speed to a desired level, as the clutch torque. This is consequently equal to the engine-torque rise request amount.

In FIG. 3, descriptions of the clutch torque and the torque phase on the coupling side, which are not related to the present invention, are omitted.

As having described, the present invention is intended to propose a shift control method for a vehicle with a DCT, which allows a gear shift operation to be stably and rapidly performed even in an ultra-low APS situation where an amount of an accelerator pedal pressed by a driver is very small, thus guaranteeing a rapid response to gear shift and stability, and consequently enhancing the marketability of the vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method for a vehicle with a Dual Clutch Transmission (DCT) comprising:
    a start determining operation of determining, by a TCU (Transmission Control Unit), whether the DCT has entered a power-on down shift inertia phase;
    a clutch control operation of controlling, by the TCU, a release-side clutch by determining a release-side clutch control torque, when the DCT enters the power-on down shift inertia phase;
    a limit determining operation of determining whether the release-side clutch control torque is reduced below a predetermined minimum control torque, while the TCU performs the clutch control operation; and
    an engine-assistance requesting operation of requesting an ECU (Engine Control Unit) to set an engine-torque rise request amount in proportion to a release-side clutch control torque reduction amount that is additionally required by the TCU, when it is determined in the limit determining operation that the release-side clutch control torque is reduced below the minimum control torque.

2. The shift control method according to claim 1, wherein the engine-assistance requesting operation is repeatedly performed until an engine speed synchronizes with a synchronous speed.

3. The shift control method according to claim 1, wherein the release-side clutch control torque of the clutch control operation is determined by adding a release torque, determined to form a change rate in target engine speed during the inertia phase, to a previous release-side clutch control torque, and then adding an obtained value to a feedback amount determined by a target change rate in engine speed and a current change rate in engine speed.

4. The shift control method according to claim 3, wherein the minimum control torque of the limit determining operation is set to zero.

5. The shift control method according to claim 3, wherein the minimum control torque of the limit determining operation is set to a clutch torque that is set at a touch point by the release-side clutch.

6. The shift control method according to claim 3, wherein the engine-torque rise request amount of the engine-assistance requesting operation is determined as a feedback amount that is accumulated after a time when the release-side clutch control torque starts to become less than the minimum control torque, after a feedback amount accumulated to a time is subtracted from an accumulative feedback amount obtained by accumulating the feedback amount used to determine the release-side clutch control torque.

* * * * *